US012771113B2

(12) United States Patent
De Cock

(10) Patent No.: US 12,771,113 B2
(45) Date of Patent: Oct. 20, 2026

(54) SIMPLIFIED THERMAL MODEL FOR ELECTRONIC FUSE

(71) Applicant: SEMICONDUCTOR COMPONENTS INDUSTRIES, LLC, Scottsdale, AZ (US)

(72) Inventor: Bart De Cock, Wespelaar (BE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 157 days.

(21) Appl. No.: 18/974,237

(22) Filed: Dec. 9, 2024

(65) Prior Publication Data

US 2026/0163353 A1 Jun. 11, 2026

(51) Int. Cl.
*H02H 3/08* (2006.01)
*H02H 1/00* (2006.01)

(52) U.S. Cl.
CPC ............ *H02H 3/08* (2013.01); *H02H 1/0007* (2013.01); *H02H 1/0053* (2013.01); *H02H 1/0092* (2013.01)

(58) Field of Classification Search
CPC .......... H02H 3/08; H02H 1/00; H02H 1/0007; H02H 1/053; H02H 1/0092; H02H 9/02; H03K 17/082; H03K 17/0822
USPC .................................... 361/86–87, 93.7–93.9
See application file for complete search history.

(56) References Cited

U.S. PATENT DOCUMENTS

2007/0253132 A1 11/2007 Nakamura et al.
2021/0044288 A1 * 2/2021 Troyer .................. H02H 9/001
2022/0140594 A1 * 5/2022 Asam .................. H02H 1/0007 361/93.1
2023/0187922 A1 6/2023 Randazzo et al.
2024/0258789 A1 * 8/2024 Nakano ................. G05B 23/02

FOREIGN PATENT DOCUMENTS

DE 112010003778 T5 3/2016
DE 102023105114 A1 9/2024

OTHER PUBLICATIONS

Thomas, K.P., "System Architectures for Real Time Power Management", University of Bristol, School of Electrical and Electronic Engineering Thesis, Dec. 1996, Open Access.

* cited by examiner

*Primary Examiner* — Danny Nguyen
(74) *Attorney, Agent, or Firm* — Quinn IP Law

(57) ABSTRACT

A method for controlling an electronic fuse ("eFuse") in an electric circuit includes sensing a measured current in the circuit using a current sensor. An accumulator value of a register/accumulator represents thermal energy associated with the measured current. A range of the measured current is determined in response to: (i) the measured current exceeding the predetermined maximum current, or (ii) the accumulator value exceeding zero. The accumulator value is linearly adjusted when the range is in a predetermined range and the accumulator value exceeds a calibrated threshold of, e.g., at least about 95% of a maximum accumulator value. The method includes commanding the eFuse to switch to an off/non-conducting state when the accumulator value reaches a predetermined maximum, thereby interrupting a flow of the electric current to the connected load.

20 Claims, 4 Drawing Sheets

FIG. 3
30
I²t Increment Rates vs. Current Ranges:
0A
R0
I0
R1
I1
R2
I2
R8
I8
R*
Current (A)

SIMPLIFIED THERMAL MODEL FOR ELECTRONIC FUSE

INTRODUCTION

The present disclosure relates to methods and systems for monitoring thermal characteristics of a reusable electronic fuse ("eFuse") in an electric circuit.

A thermal fuse is typically constructed as a passive circuit protection device that is configured to fail in an open/non-conducting state in response to an excessive current or temperature. Triggering of the fuse creates an open circuit state that prevents current from reaching a downstream load, thereby protecting the load from thermal damage. As conventional fuses are non-resettable, the fuse must be replaced after it has been triggered.

Due to the need to replace the above-described fuse after a single failure event, as well as the relatively slow response times commonly associated with non-resettable fuses, eFuses are used to an ever-increasing extent in modern electrical systems. An eFuse is an actively controllable circuit protection device typically having an integrated field-effect transistor or other controllable circuit element. The conducting state of the eFuse may be controlled in real-time during a fault condition to limit overcurrent and protect the downstream load.

SUMMARY

Disclosed herein are methods and systems for controlling an electronic fuse ("eFuse") in an electric circuit. The eFuse is controlled in accordance with an ampere squared seconds ($I^2t$) function and a linearized thermal model. The linearized thermal model in turn may be implemented in a manner that requires reduced silicon overhead relative to competing thermal model-based implementations. At the same time, the present solutions maintain a requisite response time and accuracy level when switching the eFuse off, i.e., to a non-conducting state.

An aspect of the disclosure includes a method for controlling an eFuse in an electric circuit having a connected load. The method includes sensing a measured current in the electric circuit using a current sensor as an electric current is supplied to the connected load. The method additionally includes reading or otherwise determining an accumulator value of an accumulator. The accumulator value represents a total amount of thermal energy associated with the measured current. A range of the measured current is determined in response to: (i) the measured current being greater than the predetermined maximum current, or (ii) the accumulator value being greater than zero. The method also includes linearly adjusting the accumulator value when the range of the measured current is in a predetermined range or the accumulator value is greater than a calibrated threshold, and then commanding the eFuse to switch to an off/non-conducting state when the accumulator value reaches a predetermined shutoff limit, thereby interrupting a flow of the electric current to the connected load.

Also disclosed herein is a control system for an eFuse in an electric circuit having a connected load. Embodiments of the control system include a current sensor, a processor, a computer storage medium ("memory"), and an accumulator, i.e., a register for storing numeric data for use in controlling the eFuse as set forth herein. The current sensor is configured to sense a measured current in the electric circuit as an electric current is supplied to the connected load. The accumulator has an accumulator value that represents a total amount of thermal energy associated with the measured current.

Execution of instructions from the memory causes the processor to determine a range of the measured current in response to: (i) the measured current being greater than a predetermined maximum current, or (ii) the accumulator value being greater than zero. When the range of the measured current is in a predetermined range or the accumulator value is greater than a calibrated threshold, the processor linearly adjusts the accumulator value, the calibrated threshold being greater than about 95% of a maximum accumulator value in some embodiments. Execution of instructions also causes the processor to command the eFuse to switch to an off/non-conducting state when the accumulator value reaches a predetermined shutoff limit, thereby interrupting a flow of the electric current to the connected load.

An electric circuit is also disclosed herein. A representative construction of the electric circuit includes a power supply, a load connected to the power supply via a transfer conductor, an eFuse connected to the power supply and the load, and a control system for the eFuse. The control system in one or more embodiments includes a current sensor configured to sense a measured current in the electric circuit as an electric current is supplied to the connected load. The control system also includes a processor, memory connected to the processor and containing instructions, and an accumulator. The accumulator has an accumulator value that represents a total amount of thermal energy associated with the measured current.

Execution of the instructions by the processor causes the processor to determine a range of the measured current in response to: (i) the measured current being greater than the predetermined maximum current, or (ii) the accumulator value being greater than zero. When the range of the measured current is in a predetermined range or the accumulator value is greater than a calibrated threshold, the processor linearly adjusts the accumulator value. The calibrated threshold may be greater than about 98% of a maximum accumulator value in an exemplary implementation. Execution of the instructions by the processor causes the processor to command the eFuse to switch to an off/non-conducting state when the accumulator value reaches a predetermined shutoff limit, thereby interrupting a flow of the electric current to the connected load.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

BRIEF DESCRIPTION OF THE DRAWINGS

The drawings described herein are for illustrative purposes only, are schematic in nature, and are intended to be exemplary rather than to limit the scope of the disclosure.

Figure 1:
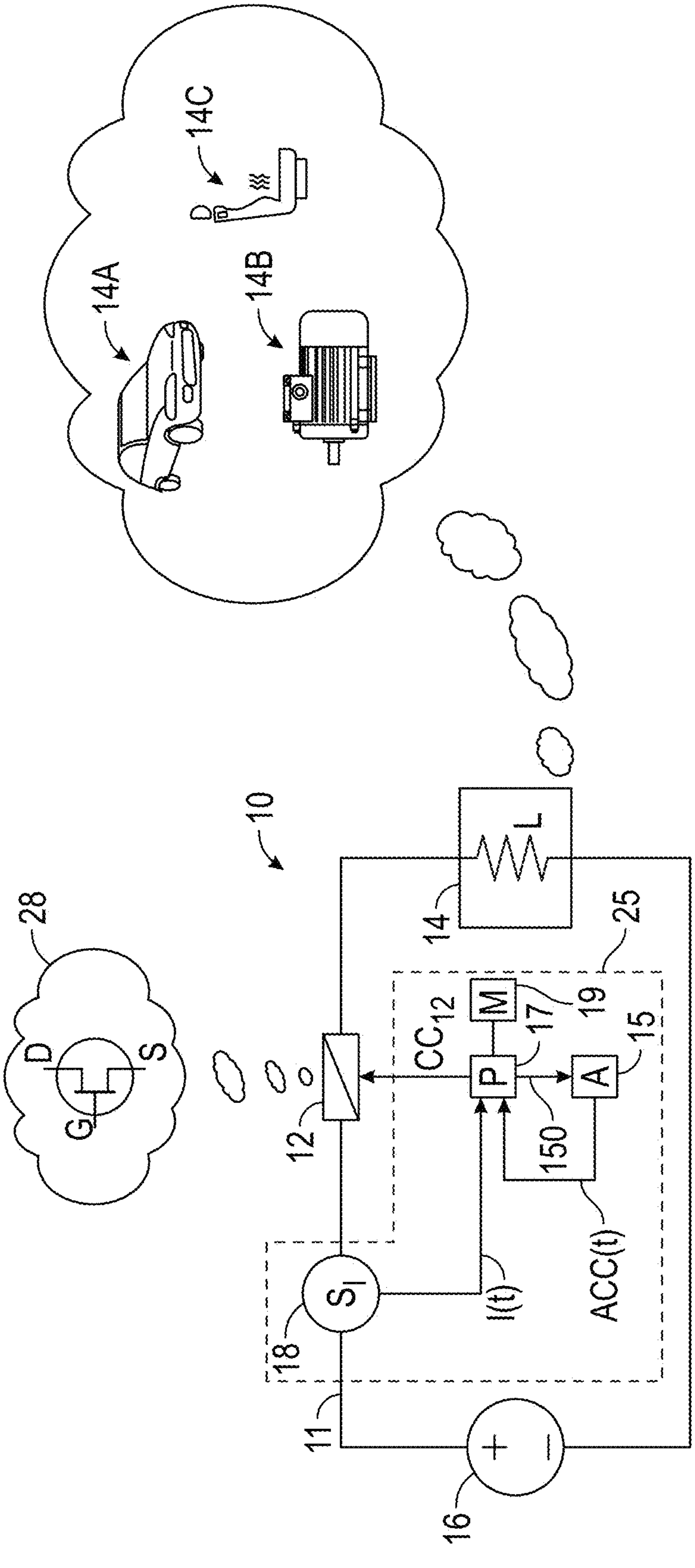
FIG. 1 illustrates a simplified electric circuit having an electronic fuse (eFuse) that is controlled using a linearized thermal model in accordance with the present disclosure.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

With reference to the drawings, wherein like reference numbers refer to the same or similar components throughout the several views, an electric circuit 10 is illustrated schematically in FIG. 1. The electric circuit 10 includes an electronic fuse (eFuse) 12 that is monitored that is controlled as set forth herein to protect a connected load (L) 14. In a possible embodiment, the eFuse 12 may include a field-effect transistor (FET) 28 having respective gate terminal (G), a drain terminal (D), and a source terminal(S), such that the eFuse 12 is an actively controlled, solid-state circuit protection device. Representative host systems for the electric circuit 10 and the load 14 may include, e.g., a vehicle 14A such as a motor vehicle, boat, rail vehicle, aircraft, etc., an electric motor 14B for any of the above, or for an appliance or standalone device, or a resistive element 14C such as a heated seat as shown, a window defroster, or another such device, without limitation.

In a possible construction, the electric circuit 10 of FIG. 1 may include a power supply 16, for instance a direct current (DC) power supply in the form of, e.g., an electrochemical battery and/or a supercapacitor. In other configurations, the power supply 16 may be a single-phase or polyphase alternating current (AC) device such as a plug-in connection to available grid power, in which case the electric circuit 10 may include an AC-to-DC converter (not shown) configured to output DC power to the connected load 14.

The electric circuit 10 of FIG. 1 also includes a current sensor (SI) 18, e.g., an ammeter, a Hall effect sensor, a sense field effect transistor (senseFET), a shunt resistor, or another application-suitable current sensing device. The current sensor 18 in a non-limiting implementation may be positioned in series with the eFuse 12 and the power supply 16, with a transfer conductor 11, e.g., a conductive wire or cable bundle, electrically connecting the eFuse 12, the load 14, the power supply 16, and the current sensor 18. In other implementations, e.g., the above-noted senseFET, the current sensor 18 may be embedded within the eFuse 12, and thus the series connection is representative of just one possible placement within the electric circuit 10. The current sensor 18 in particular is configured to measure a magnitude of an electric current (I) provided by the power supply 16 to the load 14 over time (t), with the measured current represented herein as I(t). The current sensor 18 outputs the measured current value I(t) to a processor (P) 17 of the electric circuit 10 according to a calibratable sampling interval.

As appreciated by those skilled in the art, an eFuse such as the exemplary eFuse 12 illustrated in FIG. 1 may be triggered, i.e., caused to transition from a conducting/closed state to a non-conducting/open state, based on an accumulated current value. Using the above-noted $I^2t$ function, for instance, the processor 17 may begin adjusting, i.e., incrementing or decrementing (increasing/decreasing), an analog or digital register/counter referred to hereinafter as an accumulator (A) 15. In one or more embodiments, a control system 25 for the eFuse 12 may therefore include the processor 17, the current sensor 18, the memory 19, and the accumulator 15, with execution of instructions by the processor 17, from the memory 19, causing the processor 17 to perform the various functions described below.

When the measured current I(t) rises well above a threshold maximum current, e.g., a predetermined overcurrent level, a shorter duration may elapse before the eFuse 12 is triggered by transmitting a switching control signal $CC_{12}$ to the eFuse 12 from the processor 17. Conversely, a current above but close to the threshold maximum current will generally correspond to longer elapsed times before the eFuse 12 is triggered. The manner in which thermal models are applied in conventional circuits can therefore be slow to converge, and require additional circuit complexity and cost ("silicon overhead").

In the present disclosure, the use of a linearized version of the $I^2t$ function allows the processor 17 to accurately track temperature effects of the transfer conductor 11 supplying an electric current to the load 14 relative to a calibrated trigger point of the eFuse 12, thus ensuring sufficient time is allowed for conducting heat away from the eFuse 12. When an electric current in the eFuse 12 changes over time, an accurate estimation is needed of dissipated power in the protected load 14. This estimation is performed by the processor 17 and used to determine an optimal switch-off moment for opening the eFuse 12 and breaking the circuit connection to the load 14. Using the $I^2t$ function, therefore, timing of the on/off switching state of the eFuse 12 is more closely tied to actual conditions of the overcurrent event.

In an illustrative example implementation, the electric circuit 10 of FIG. 1 may be protected by a main fuse (not shown) upstream of the eFuse 12, e.g., a nominal 15A non-resettable thermal fuse or circuit breaker. The processor 17 would not accumulate a value in the accumulator 15 in accordance with the $I^2t$ function so long as the current supplied to the eFuse 12 remains within a normal range, i.e., 15A in this representative case. However, an overcurrent condition experienced during a short circuit in the electric circuit 10 may result in rapidly elevated currents and temperatures, thus requiring the eFuse 12 to quickly open to protect the load 14.

To this end, an accumulator value ACC(t) or "count" of the accumulator 15 is updated by the processor 17 via an accumulator input signal 150 in response to the measured current I(t). This action is performed using the linearized $I^2t$ function described herein, which also decreases when the current is below the threshold, e.g., when the electric circuit 10 is shut off or in the absence of an electrical fault. In a static domain, the on/off conducting state control of the eFuse 12 is straightforward. However, an overcurrent condition may be transient and/or may fluctuate slightly above and below a threshold "trip current" level in operation, e.g., by ±10-15%. Such current fluctuations could delay triggering of the eFuse 12. As extended triggering times are not desirable in certain applications, the present approach relies on application of a linearized thermal model emulating performance of the transfer conductor 11 of the electric circuit 10.

Figure 4:
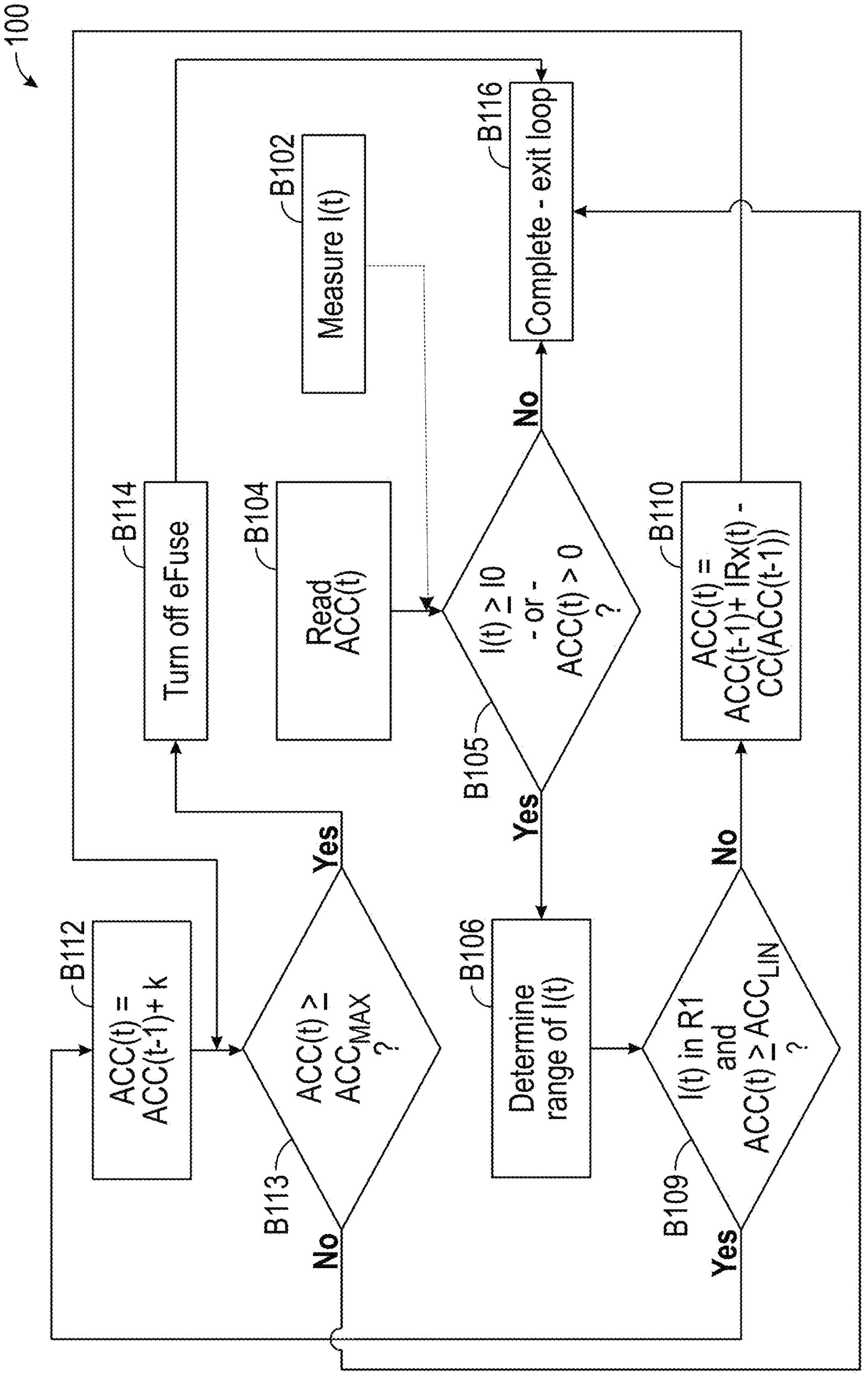
FIG. 4 is a flow chart describing an embodiment of a method for controlling the eFuse of FIG. 1.

The functions performed during execution of a method 100, an example implementation of which is described in detail below with reference to FIG. 4, are embodied computer-readable instructions and executed from a computer readable storage medium ("memory") (M) 19. The memory 19 may be embodied for instance as magnetic or optical media, CD-ROM, and/or solid-state memory. The processor 17 may encompass one or more control modules, control units, microprocessor chips, Application Specific Integrated Circuit(s) (ASIC), Field-Programmable Gate Array(s) (FPGA(s)), electronic circuit(s), or central processing units. Associated memory component(s) of the memory 19 include non-transitory computer-readable storage devices such as read only memory, programmable read only memory, hard drive, etc. Non-transitory components of the memory 19 used herein are capable of storing machine-readable instructions in the form of one or more software or firmware programs or routines, combinational logic circuit(s), input/output circuit(s) and devices, signal conditioning and buffer circuitry and other components that can be accessed by one or more processors 17 to provide a described functionality.

Figure 2:
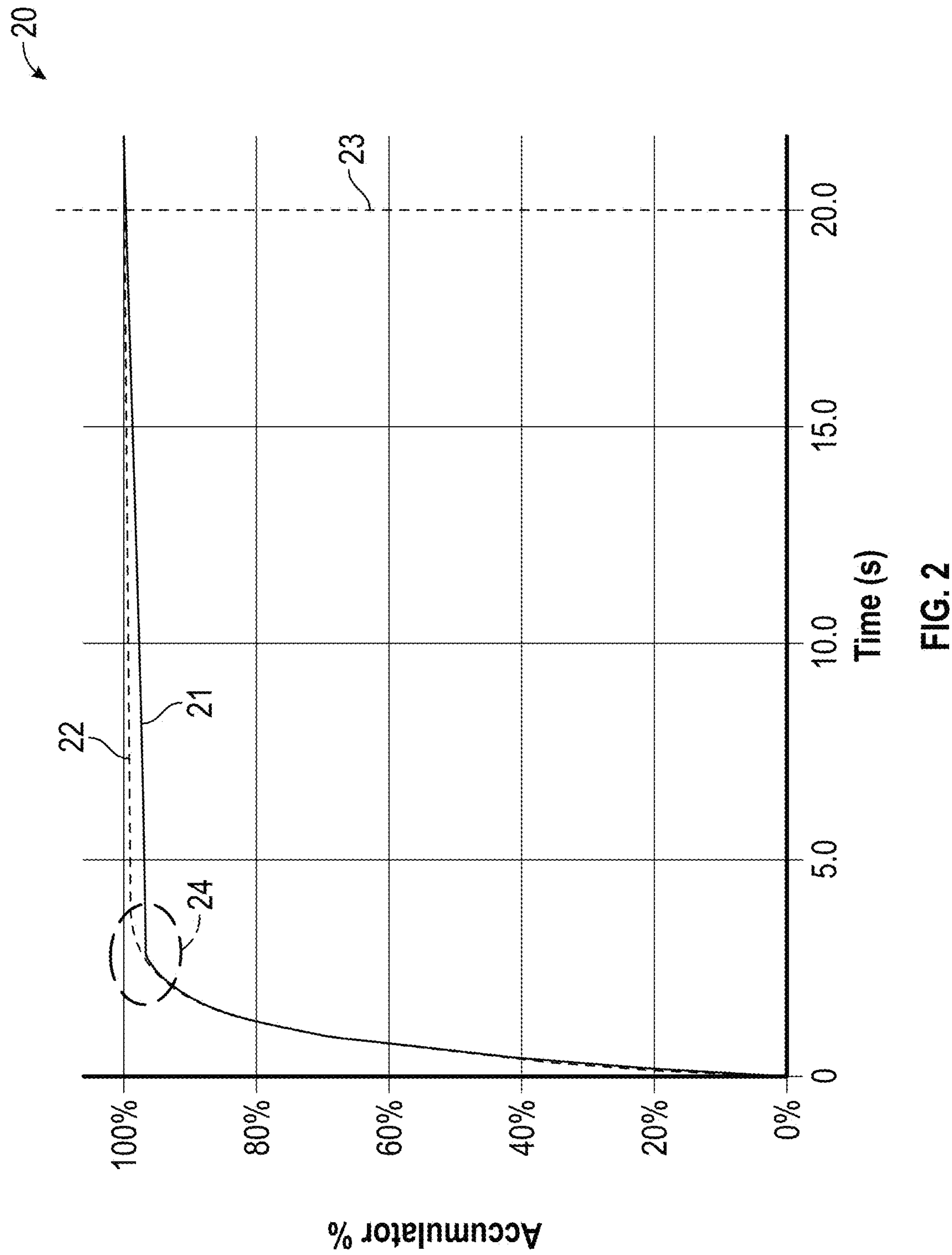
FIG. 2 is a time plot of an accumulator value illustrating performance of the linearized thermal model noted above.

LINEARIZED $I^2T$ FUNCTION: Referring to FIG. 2, a time plot 20 illustrates operation of the above-noted accumulator 15 for use in a linearized model, with time in seconds(s) depicted on the horizontal axis and an accumulator value indicated as a percentage (%) on the vertical axis. Time plot 20 includes a linearized trace 21 in accordance with the present teachings and a conventional baseline trace 22 for the purpose of comparison. The linearized trace 21 as used herein acts as a linear thermal model and is used as an input to decision logic of the processor 17, e.g., when performing the method 100 of FIG. 4 as described below. Traces 21 and 22 are both configured to open/turn off the eFuse 12 when the accumulator value ACC(t) reaches 100%, which occurs at about t=20 s in the FIG. 2 example.

Non-linear trace 22 is an iteratively derived, fully accurate $I^2t$ thermal model, as appreciated in the art. Such a model may suffer from accuracy issues when extended trip times are present, for instance in the example of FIG. 2 wherein tripping of the eFuse 12 occurs at t=20 s (line 23). Implementation of a non-linear thermal model to form trace 22 thus relies on high-resolution floating-point calculations, increased complexity of requisite logic circuitry, and other inefficiencies. After about t=5 s, the rate of increase in trace 22 is minimal. In contrast, the linearized trace 21 used herein vastly simplifies the employed $I^2t$-based thermal model while maintaining accuracy. Note that the accumulator value, i.e., ACC(t) of FIG. 1, still reaches 100% at t=20 s, and thus there is no drop off in performance when using the linearized model of trace 21.

The processor 17 of FIG. 1 may perform a similar iterative calculation to increment/decrement the accumulator value ACC(t), for instance every few milliseconds, in an amount that depends on the range of the measured current I(t) as set forth below. As part of the present disclosure, the processor 17 may do so until the accumulator value ACC(t) increases to within a predetermined range (ε) of the maximum (100%) threshold for triggering the eFuse 12. The processor 17 therefore begins incrementing the accumulator value ACC(t) by a constant amount when the trace 21 reaches a lower threshold, i.e., when ACC(t)≥(100−ε). In FIG. 2, the linearization of trace 21 begins in zone 24, with zone 24 coinciding with a location at which the trace 21 begins to diverge in a linear manner from the non-linear baseline trace 22 summarized above.

In a possible implementation, the predetermined range (ε) may be about 2% to about 5%. Values at the higher end of this range, i.e., falling closer to 5%, generally correspond to reduced complexity, albeit at the cost of reduced accuracy. Thus, it may be advantageous to use a smaller predetermined range (ε) in some embodiments depending on the application, for instance about 1-2%. In implementations in which the accumulator 15 of FIG. 1 is a digital device, the accumulator value ACC(t) can be incremented in even smaller/decimal amounts such as 0.1% or 0.01%, in which case the predetermined range (ε) may be reduced. For instance, a predetermined range (ε) of about 0.1% to about 1% may be used in such digital embodiments of the accumulator 15. Thus, the location of zone 24 may vary with the construction of the accumulator 15.

Figure 3:
FIG. 3 illustrates representative current bins usable by the linearized thermal model described herein.

Referring to a representative bin plot 30 of FIG. 3, which depicts $I^2t$ increment rates vs. current ranges, the present approach includes assigning the measured current I(t) from the current sensor 18 of FIG. 1 to a corresponding virtual location or "bin" based on the range of the current I(t). Based on the bin, the processor 17 may increment/decrement the accumulator value ACC(t) in accordance with trace 21 of FIG. 2, thereafter controlling the on/off state of the eFuse 12. The bin plot 30 illustrates that the measured current I(t) from the current sensor 18 of FIG. 1 may fall into a predetermined current range, e.g., 0 A to I0 (range R0), I0 to I1 (range R1), I1 to I2 (range R2), and so forth, with the bin plot 30 of FIG. 3 continuing on until a nominal range R8 encompassing the currents I2 to I8. A range R* above range R8 may correspond to values outside of the $I^2t$ range. Such a binning approach may be used in the course of method 100.

Referring now to FIG. 4, a representative embodiment of the method 100 may be used for controlling the eFuse 12 in the electric circuit 10 of FIG. 1. The method 100 is described as a sequence of steps, code segments, or logic blocks, each of which may be embodied as computer-readable instructions. Such instructions may be recorded in memory 19 or in another accessible non-volatile, non-transitory memory location, and executed by the processor 17 of FIG. 1 when performing the described functions. Execution of the instructions embodying the method 100 involves the cooperative use of the accumulator 15, the processor 17, the current sensor 18, and the memory 19 when controlling the on/off conducting state of the eFuse 12.

Beginning with block B102 ("Measure I(t)"), the method 100 includes sensing, using the current sensor 18 of FIG. 1, a measured electric current I(t) in the electric circuit 10 as an electric current is supplied to the connected load 14 by the power supply 16. The measured current I(t) is then communicated to the processor 17 using wireless or hard-wired means. The method 100 proceeds to block B105 after the measured current I(t) has been determined.

Also beginning with block B104 ("Read ACC(t)"), which may be performed simultaneously with block B102, the method 100 includes reading the accumulator 15 of FIG. 1. This action determines the accumulator value ACC(t) regardless of whether the measured current I(t) from block B102 is zero or if it exceeds a predetermined overcurrent level. For instance, the accumulator value ACC(t) may be non-zero due to past events. As noted above, the overcurrent level is application-specific, and thus could variously include 10-amps (A), 15 A, or 20 A, etc. An actual counter value of the accumulator 15 represents an accumulated total level of thermal energy associated with the measured current I(t). The method 100 proceeds to block B105 after the processor 17 has read the accumulator 15 accordingly and thus obtained the accumulator value ACC(t).

Block B105 ("I(t)≥I0− or −ACC(t)>0"?) entails determining a magnitude of the measured current I(t) in response to (i) the measured current I(t) being greater than a predetermined minimum current, e.g., I0 of FIG. 3, or (ii) the actual counter value ACC(t) being greater than zero. The method 100 proceeds to block B106 when one or both conditions are true, and to block B116 in the alternative when neither condition is true.

At block B106 ("Determine range of I(t)") of FIG. 4, the method 100 includes determining a range of the measured current I(t) from block B102. For instance, the processor 17 may compare the measured current I(t) to a plurality of defined current ranges, such as the representative ranges R0, R1, R2, . . . , R8 (and R*) of FIG. 3. The method 100 proceeds to block B109 once the range has been determined.

At block B109 ("I(t) in R1 and ACC(t)≥$ACC_{LIN}$?") the processor 17 determines whether the range of the measured current I(t) is in a predetermined range, e.g., R1, and the counter value for the accumulator 15 of FIG. 1 is greater than a calibrated threshold suitable for linearizing trace 21 of FIG. 3, i.e., 100–ε as noted above. For instance, the threshold in a possible approach may be greater than about 95% of a maximum accumulator value ACC(t) of 100% when ¿=5%. The method 100 proceeds to block B112 when both conditions are true, with the method 100 instead proceeding to block B110 when only one (or neither) condition is true.

At block B110 ("ACC(t)=ACC(t–1)+IRx(t)–CC (ACC(t–1)"), the method 100 of FIG. 4 takes action via the processor 17 when at least one of the two conditions of block B109 are not satisfied, i.e., the measured current I(t) is not within a defined range, e.g., R1, or ACC(t) is less than the corresponding ACC(t) value used to initiate linearization, i.e., $ACC_{LIN}$. For example, block B110 is performed when the measured current I(t) is in the defined range, e.g., R1, and trace 21 of FIG. 3 remains below zone 24. In this case, the actual accumulator value ACC(t) is adjusted iteratively as a function of (i) a current increment rate (IRx), and (ii) a cooling constant (CC) of the system.

At each sample interval, the transfer conductor 11 is heating up at an incremental rate IRx and cooling down in accordance with the cooling constant (CC). As part of the present approach, block B110 includes adjusting by a small fraction of the previous value, i.e., CC (ACC(t–1). The cooling constant (CC) as used herein is equal to $$\frac{1}{2^n},$$

where n is an integer or natural number. For instance, n=7 in a possible implementation of the electric circuit 10 of FIG. 1. The method 100 proceeds to block B113 after completing the described adjustment to ACC(t).

Block B112 ("ACC(t)=ACC(t–1)+k") includes linearly increasing the actual accumulator value ACC(t) by a constant value (k). In some embodiments, linearly increasing the accumulator value ACC(t) by the constant value (k) includes increasing the accumulator value ACC(t) by an integer value. i.e., 1, 2, 3, etc. In other implementations, linearly increasing the ACC(t) by the constant value (k) includes increasing the accumulator value ACC(t) by a decimal value, for instance 0.125, 0.25, 0.35, 1.25, 1.5, etc. The method 100 thereafter proceeds to block B113.

Block B113 ("ACC(t)≥$ACC_{MAX}$?") includes determining if the accumulator value ACC(t) has exceeded a maximum value ($ACC_{MAX}$), typically 100% (the maximum count of the accumulator 15 of FIG. 1). If so, the method 100 proceeds to block B114. The method 100 proceeds in the alternative to block B112 when the actual accumulator value ACC(t) is less than the maximum value.

At block B114 ("Turn off eFuse"), the processor 17 of FIG. 1 (or another dedicated control processor) turns off the eFuse 12. Block B114 may include commanding the eFuse 12 to switch to an off/non-conducting state when the actual counter value ACC(t) reaches a predetermined limit, typically ACC(t)=100%, thereby interrupting the current flow to the load 14 of FIG. 1. When the eFuse 12 is configured as a FET-based switch, for instance, e.g., a MOSFET, the switching control signal CC12 of FIG. 1 may entail applying a gate control signal as a voltage signal to the FET to cause the FET to operate in cutoff region, i.e., in a fully off state. The method 100 thereafter proceeds to block B116.

Block B116 ("Complete—exit loop") includes exiting the control loop of method 100. The method 100 may resume anew with block B102 with the next measurement of the measured current I(t) via the current sensor 18 of FIG. 1 or with block B104 with the next reading of the accumulator value ACC(t). As the method 100 continues in a loop, the state of the eFuse 12 will eventually be changed back to on/conducting when the accumulator value ACC(t) again drops below a calibratable limit, e.g., 25%.

Using the present teachings, the problem of slow convergence in trace 22 of FIG. 3 is addressed, e.g., in the computing, industrial, automotive, and other arts. Due to slow convergence, thermal models may be prone to rounding errors, and thus often resort to high accuracy floating-point operations. In lieu of the fully non-linear iterative thermal model-based approach, the method 100 instead enables the processor 17 to step into a linear region after approaching the maximum accumulator value ACC(t) to within a predetermined range thereof, e.g., 95% to 99.9% of the maximum/100% $I^2t$. Relative to existing approaches, the present teachings enable true temperature modeling for high-quality $I^2t$-based operation of the eFuse 12 of FIG. 1, with reduced digital overhead expenses and improved compatibility with compact state machine calculators. These and other benefits of the present teachings will be readily appreciated by those skilled in the art now having the benefit of the foregoing disclosure.

Representative embodiments of the disclosure are shown in the drawings and described in detail above, with the understanding that these embodiments are provided as an exemplification of the disclosed principles and not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including", "containing", "comprising", "having", and the like, shall each mean "including without limitation". Moreover, words of approximation such as "about", "almost", "substantially", "generally", "approximately", etc., may each be used herein to denote "at, near, or nearly at", or "within 0-5% of", "within acceptable manufacturing tolerances", or any logical combination thereof.

While several modes for carrying out the many aspects of the present teachings have been described in detail, those familiar with the art to which these teachings relate will recognize various alternative aspects for practicing the present teachings that are within the scope of the appended claims. The above description and accompanying drawings are illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments. Moreover, the present concepts expressly include combinations and sub-combinations of the described elements and features. The detailed description and the drawings are supportive and descriptive of the present teachings, with the scope of the present teachings defined solely by the claims.

I claim:

1. A method for controlling an electronic fuse ("eFuse") in an electric circuit having a connected load, the method comprising:

sensing a measured current in the electric circuit using a current sensor as an electric current is supplied to the connected load;

determining an accumulator value of an accumulator, the accumulator value representing a total amount of thermal energy associated with the measured current;

determining a range of the measured current in response to: (i) the measured current being greater than a predetermined maximum current, or (ii) the accumulator value being greater than zero;

linearly adjusting the accumulator value when the range of the measured current is in a predetermined range and the accumulator value is greater than a calibrated threshold; and commanding the eFuse to switch to an off/non-conducting state when the accumulator value reaches a predetermined shutoff limit, thereby interrupting a flow of the electric current to the connected load.

2. The method of claim 1, wherein the linearly adjusting the accumulator value includes linearly adjusting the accumulator value by an integer value.

3. The method of claim 1, wherein the linearly adjusting the accumulator value includes linearly adjusting the accumulator value by a decimal value.

4. The method of claim 1, wherein the linearly adjusting the accumulator value occurs when the accumulator value exceeds 98% of the maximum accumulator value.

5. The method of claim 1, wherein the commanding the eFuse to switch to the off/non-conducting state includes transmitting a switching control signal to the eFuse via a processor.

6. The method of claim 5, wherein the eFuse includes a field-effect transistor (FET), and wherein transmitting the switching control signal to the eFuse includes transmitting a gate control signal to a gate terminal of the FET.

7. The method of claim 1, further comprising:

when the range of the measured current is not in the predetermined range or the accumulator value is less than a calibrated threshold, adjusting the accumulator value as a function of (i) a current increment rate, and (ii) a cooling constant of the eFuse.

8. A control system for an electronic fuse ("eFuse") in an electric circuit having a connected load, comprising:

a current sensor configured to sense a measured current in the electric circuit as an electric current is supplied to the connected load;

a processor;

a computer storage medium ("memory") connected to the processor and containing instructions; and an accumulator having an accumulator value that represents a total amount of thermal energy associated with the measured current, wherein execution of the instructions by the processor causes the processor to:

determine a range of the measured current in response to: (i) the measured current being greater than a predetermined maximum current, or (ii) the accumulator value being greater than zero;

linearly adjust the accumulator value when the range of the measured current is in a predetermined range and the accumulator value is greater than a calibrated threshold, the calibrated threshold being greater than about 95% of a maximum accumulator value; and command the eFuse to switch to an off/non-conducting state when the accumulator value reaches a predetermined shutoff limit, thereby interrupting a flow of the electric current to the connected load.

9. The control system of claim 8, wherein the execution of the instructions causes the processor to linearly adjust the accumulator value by an integer value.

10. The control system of claim 8, wherein the execution of the instructions causes the processor to linearly adjust the accumulator value by a decimal value.

11. The control system of claim 8, wherein the execution of the instructions causes the processor to linearly adjust the accumulator value when the accumulator value exceeds 98% of the maximum accumulator value.

12. The control system of claim 8, wherein the execution of the instructions causes the processor to transmit a switching control signal to the eFuse to thereby command the eFuse to switch to the off/non-conducting state.

13. The control system of claim 12, wherein the execution of the instructions causes the processor to transmit a gate control signal to a gate terminal of a field-effect transistor (FET) of the eFuse as the switching control signal.

14. The control system of claim 8, wherein the execution of the instructions causes the processor, when the range of the measured current is not in the predetermined range or the accumulator value is less than a calibrated threshold, to adjust the accumulator value as a function of (i) a current increment rate, and (ii) a cooling constant of the eFuse.

15. An electric circuit, comprising:

a power supply;

a load connected to the power supply via a transfer conductor;

an electronic fuse ("eFuse") connected to the power supply and the load; and a control system for the eFuse, comprising:

a current sensor configured to sense a measured current in the electric circuit as an electric current is supplied to the connected load;

a processor;

a computer storage medium ("memory") connected to the processor and containing instructions; and an accumulator having an accumulator value that represents a total amount of thermal energy associated with the measured current, wherein execution of the instructions by the processor causes the processor to:

determine a range of the measured current in response to: (i) the measured current being greater than a predetermined maximum current, or (ii) the accumulator value being greater than zero;

linearly adjust the accumulator value when the range of the measured current is in a predetermined range and the accumulator value is greater than a calibrated threshold, the calibrated threshold being greater than about 98% of a maximum accumulator value; and command the eFuse to switch to an off/non-conducting state when the accumulator value reaches a predetermined shutoff limit, thereby interrupting a flow of the electric current to the connected load.

16. The electric circuit of claim 15, wherein the power supply includes an electrochemical battery and the load includes an electric motor or a resistive element.

17. The electric circuit of claim 15, wherein the execution of the instructions causes the processor to linearly adjust the accumulator value when the accumulator value exceeds 99% of the maximum accumulator value.

18. The electric circuit of claim 17, wherein the execution of the instructions causes the processor to transmit a switching control signal to the eFuse to thereby command the eFuse to switch to the off/non-conducting state.

19. The electric circuit of claim 18, wherein the execution of the instructions causes the processor to transmit a gate control signal to a gate terminal of a field-effect transistor (FET) of the eFuse as the switching control signal.

20. The electric circuit of claim 15, wherein the execution of the instructions causes the processor, when the range of the measured current is not in the predetermined range or the accumulator value is less than a calibrated threshold, to adjust the accumulator value as a function of (i) a current increment rate, and (ii) a cooling constant of the eFuse.

* * * * *